United States Patent

Okamoto et al.

[11] Patent Number: 4,649,669
[45] Date of Patent: Mar. 17, 1987

[54] CONSTRUCTION OF DOOR FRAME IN MOTOR VEHICLE DOOR

[75] Inventors: Yuji Okamoto, Toyota; Shunichi Nakamura, Anjou, both of Japan

[73] Assignees: Toyota Jidosha Kabushiki Kaisha; Aishin Seiki Kabushiki Kaisha, both of Japan

[21] Appl. No.: 765,931

[22] Filed: Aug. 15, 1985

[30] Foreign Application Priority Data

Aug. 21, 1984 [JP] Japan .................. 59-126865[U]

[51] Int. Cl.$^4$ .................................. E05F 11/38
[52] U.S. Cl. ........................ 49/489; 49/374; 296/201
[58] Field of Search ............ 49/489, 498, 374; 296/201, 202, 191, 187, 146; 52/729

[56] References Cited

U.S. PATENT DOCUMENTS 2,457,250  12/1948  Macomber .................. 52/729 X

FOREIGN PATENT DOCUMENTS 2551240  5/1976  Fed. Rep. of Germany ........ 49/489

Primary Examiner—Kenneth Downey
Attorney, Agent, or Firm—Finnegan, Henderson, Farabow, Garrett & Dunner

[57] ABSTRACT

Construction of a door frame in a motor vehicle including a first channel for holding a door weather strip and a second channel contiguous to the first channel on the outboard side for holding a door glass run. The first and the second channels are formed by a continuously bending plate member. A bottom portion of the first channel is a double-ply structure having a rear surface directed toward a compartment and an outer end section. The second channel is formed by a pair of bent extensions extended in two directions, thereby separating each other from the outer end section of the bottom portion. The pair of bent extensions are arc-welded at respective bending corner portions positioned along the outer end section of the bottom portion of the first channel, to integrally connect the pair of bent extensions. The door glass run is mounted along the pair of bent extensions substantially covering and concealing the bending corner portions.

8 Claims, 3 Drawing Figures

CONSTRUCTION OF DOOR FRAME IN MOTOR VEHICLE DOOR

BACKGROUND OF THE INVENTION

1. Field of the Invention

This invention relates to construction of a door frame in a motor vehicle door, and more particularly to improvements in construction of a door frame, wherein a plate member is continuously bent to form two channels contiguous to each other.

2. Description of the Related Art

As shown in FIG. 3 for example, there has heretofore been a door frame F comprising a first channel 2 for holding a door weather strip, not shown, and a second channel 4 contiguous to the first channel 2 on the outboard side, for holding a door glass run, not shown, wherein the first and the second channels 2 and 4 are formed by continuously bending a plate member, a bottom portion 6 of the first channel 2 is of double-ply structure and the rear surface thereof is directed toward a compartment 8 and the second channel 4 is formed by a pair of bent extensions 3A and 3B which are bent and extended in two direction separating from each other from the outer end position of the bottom portion 6 of double-ply structure.

In FIG. 3 designated at 5 is a third channel for holding a sub-door weather strip, not shown.

In the conventional construction of the door frame as shown in FIG. 3, plate sections 6A and 6B constituting the bottom portion 6 are welded to each other by spot weldings at suitable intervals in the longitudinal direction thereof.

Furthermore, a bottom portion 5A of the third channel 5 and a side wall 4A superposed on the bottom portion 5A are also spot-welded together in a superposed state.

In this case, the sub-door weather strip is mounted to the third channel 5 and the glass run is mounted to the second channel 4, so that the spot-weld marks for welding the bottom portion 5A to the side wall 4A is concealed.

However, spot-weld marks 9 at the bottom portion 6 of the first channel 2 are exposed to the compartment's side.

As a result, the mark portions, which are identified by the reference numeral 9, should be repaired to trim the surfaces.

Furthermore, since the bottom portion 6 is spot-welded at the center position along the widthwise direction, the upper half portion of the bottom portion 6 has a low resisting force against separating the plate sections 6A and 6B from the side of the second channel 4.

SUMMARY OF THE INVENTION

It is therefore the primary object of the present invention to provide construction of a door frame in a motor vehicle door, wherein the welded portions are not exposed to the compartment's side.

Furthermore, another object of the present invention is to provide construction of a door frame in a motor vehicle door, where the force of separating from each other plate sections of a two-ply structure is strongly resisted.

To this end, the present invention contemplates that, in construction of a door frame in a motor vehicle door, comprising a first channel for holding a door weather strip and a second channel contiguous to the first channel on the outboard side, for holding a door glass run, wherein the first and the second channels are formed by continuously bending a plate member, a bottom portion of the first channel is of double-ply structure and the rear surface thereof is directed toward a compartment and the second channel is formed by a pair of bent extensions extended in two directions separating each other from the outer end position of the bottom portion of the double-ply structure of the first channel, the pair of bent extensions are arc-welded at respective bending corner portions which are at the outer end position of the bottom portion of the first channel, to thereby be integrally connected to each other, and arc-welded portions of said pair of bent extensions are concealed by said door glass run held in said second channel.

To the above end, the present invention contemplates that one of plate sections constituting the bottom portion of the first channel is connected to one of the bent extensions and the other is connected to other of the bent extensions.

To the above end, the present invention contemplates that one of the bent extensions is connected to a side wall of the second channel, the side wall is connected to a molding portion which perpendicularly intersects the side wall and constitutes a part of the outer surface of the vehicle body.

To the above end, the present invention contemplates that said molding portion is connected to the third channel.

To the above end, the present invention contemplates that said side wall of the second channel and a bottom portion of the third channel are connected to each other in the double-ply structure.

In this invention, the plate sections of double-ply structure constituting the bottom portion of the first channel are arc-welded at the bent portions of the plate members from the side corresponding to the bottom portion of the second channel, whereby the weld marks are concealed by a door glass run held by the second channel.

DETAILED DESCRIPTION OF THE PREFERRED EMBODIMENT

Description will be given of an embodiment of the present invention with reference to the drawings.

Figure 1:
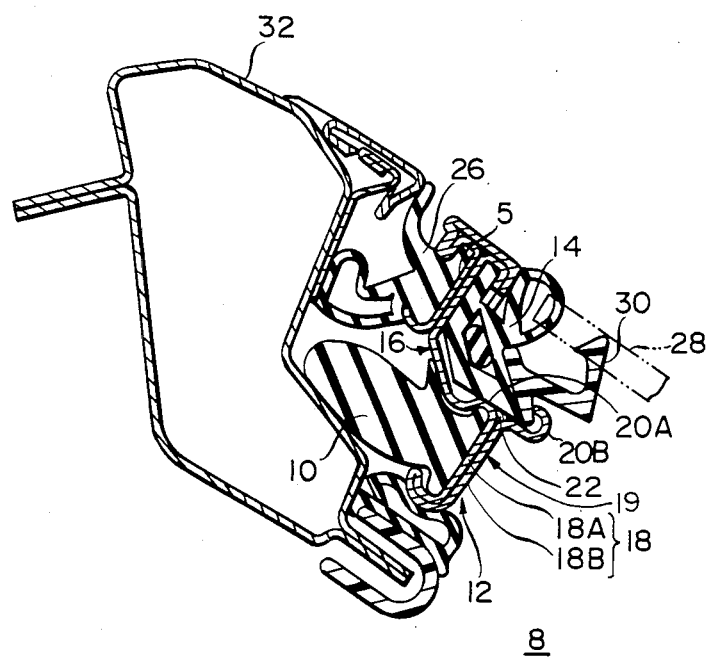
FIG. 1 is a sectional view showing the construction of the door frame in the motor vehicle embodying the present invention.
Figure 2:
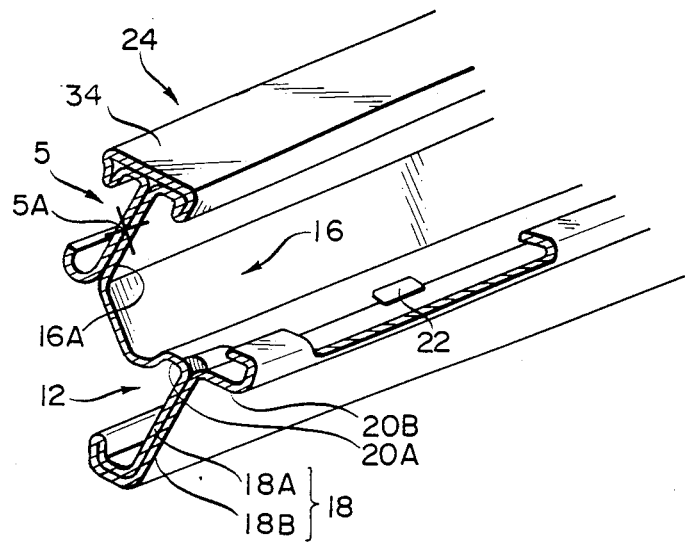
FIG. 2 is a partially sectional, perspective view showing an embodiment of the construction of the door frame in the motor vehicle door according to the present invention.

As shown in FIGS. 1 and 2, according to this embodiment, in construction of a door frame 24 in a motor vehicle door, comprising a first channel 12 for holding a door weather strip 10 and a second channel 16 contiguous to the first channel 12 on the outboard side, for holding a door glass run 14, wherein the first and the second channels 12 and 16 are formed by continuously bending a plate member, a bottom portion 18 of the first channel 12 is of double-ply structure and the rear surface thereof is directed toward a compartment 8 and the second channel 16 is formed by a pair of bent extensions 20A and 20B extended in two directions separating each other from the outer end section 19 of the bottom portion 18 of double-ply structure of the first channel 12, the pair of bent extensions 20A and 20B are arc-welded at respective bending corner portions which are at the outer end position of the bottom portion 18 of the first channel 12, to thereby be integrally connected to each other.

As shown primarily in FIG. 2, designated at 22 is a weld padding portion produced by arc-welding.

The arc-welded portions are arranged at suitable intervals in the longitudinal direction of the door frame 24.

FIG. 1 shows a sub-door weather strip 26 held by the third channel 5, a door glass 28 guided by the door glass run 14 and brought into contact with the door glass weather strip 30 integrally formed on this door glass run 14, and a front pillar 32. The door glass weather strip 30 seals the compartment along the door glass 28 when it is fully closed.

One of plate sections 18A and 18B constituting the bottom portion 18 of the first channel 12 is connected to the bent extension 20A and the other is connected to the bent extension 20B.

The bent extension 20A is connected to a side wall 16A of the second channel 16. The side wall 16A is connected to a molding portion 34 which perpendicularly intersects the side wall 16A and constitutes a part of the outer surface of the vehicle body. The molding portion 34 is connected to the third channel 5.

Figure 3:
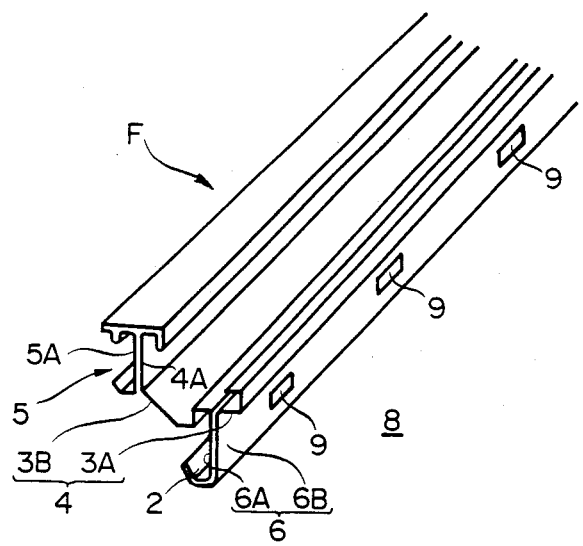
FIG. 3 is a schematic, partially sectional, perspective view showing the conventional construction of the door frame in the motor vehicle door.

The side wall 16A of the second channel 16 and a bottom portion 5A of the third channel 5 are connected to each other in the double-ply structure similar to the conventional door frame shown in FIG. 3.

In this embodiment, the arc-welded padding portion 22 is disposed at the bottom portion of the second channel 16 and shielded by the door glass run 14 held in the second channel 16, so that there is no need to trim the weld marks.

Furthermore, the arc-welded padding portion 22 is adapted to weld the bending corner portion where the plate sections 18A and 18B are connected to bent extensions 20A and 20B at the outer end portion of the bottom portion 18 of the first channel, so that the resistant force to counter separating the plate sections 18A and 18B from each other is increased.

Furthermore, in the case of the conventional door frame shown in FIG. 3, the bottom portion of the first channel is worked under a continuous process upon the trimming by rolls of the door frame, and, in the case of the arc-welding in the above embodiment, the arc-welding is worked under the continuous process similarly to the above, so that production efficiency is not lowered.

Additionally, according to the above embodiment the third channel 5 is integrally formed contiguously to one of the side walls 16A of the second channel 16. However, the present invention need not necessarily be limited to this, and is generally applicable to the case where the plate sections of double-ply structure constituting the bottom portion of the first channel are bent at the outer end position thereof into two directions opposite to each other, and where the third channel is not provided.

What is claimed is:

1. Construction of a door frame in a motor vehicle door, comprising a first channel for holding a door weather strip and a second channel contiguous to said first channel on the outboard side for holding a door glass run, wherein said first and said second channels are formed by a continuously bending plate member, a bottom portion of said first channel being a double-ply structure having an outer end section and wherein said second channel is a formed by a pair of bent extensions extended in two directions separating each other from said outer end section of said bottom portion, each of said pair of bent extensions including a bending corner portion, said pair of bent extensions being arc-welded at spaced intervals along said bending corner portions proximate said outer end section of the bottom portion of said first channel, thereby integrally connecting said pair of bent extensions, said door glass run being mounted along said pair of bent extensions substantially covering and concealing said bending corner portions.

2. Construction of a door frame in a motor vehicle door as set forth in claim 1, wherein said bottom portion of said first channel includes a pair of plate sections defining said double-ply structure, one of said plate sections being connected to one of the bent extensions and the remaining one of said plate sections being connected to other one of said bent extensions.

3. Construction of a door frame in a motor vehicle door as set forth in claim 1, wherein said second channel includes a side wall, one of said bent extensions being connected to said side wall, said second channel also includes a molding portion extending substantially perpendicular to said side wall and mounted thereon, said molding portion defining a part of the outer surface of the vehicle.

4. Construction of a door frame in a motor vehicle door as set forth in claim 2, wherein said second channel includes a side wall, one of said bent extensions being connected to said side wall, said second channel also includes a molding portion extending substantially perpendicular to said side wall and mounted thereon, said molding portion defining a part of the outer surface of the vehicle.

5. Construction of a door frame in a motor vehicle door as set forth in claim 3, wherein said plate member defines a third channel, said molding portion being connected to said third channel.

6. Construction of a door frame in a motor vehicle door as set forth in claim 4, wherein said plate member defines a third channel, said molding portion being connected to said third channel.

7. Construction of a door frame in a motor vehicle door as set forth in claim 5, wherein said third channel includes a bottom section, said side wall of said second channel and said bottom section of said third channel being connected to each other in a double-ply configuration.

8. Construction of a door frame in a motor vehicle door as set forth in claim 6, wherein said third channel includes a bottom section, said side wall of the said second channel and said bottom section of said third channel being connected to each other in a double-ply configuration.

* * * * *